June 9, 1964 D. D. JONES ETAL 3,136,057
TUBE CUTTING TOOL
Filed Oct. 31, 1962 2 Sheets-Sheet 1
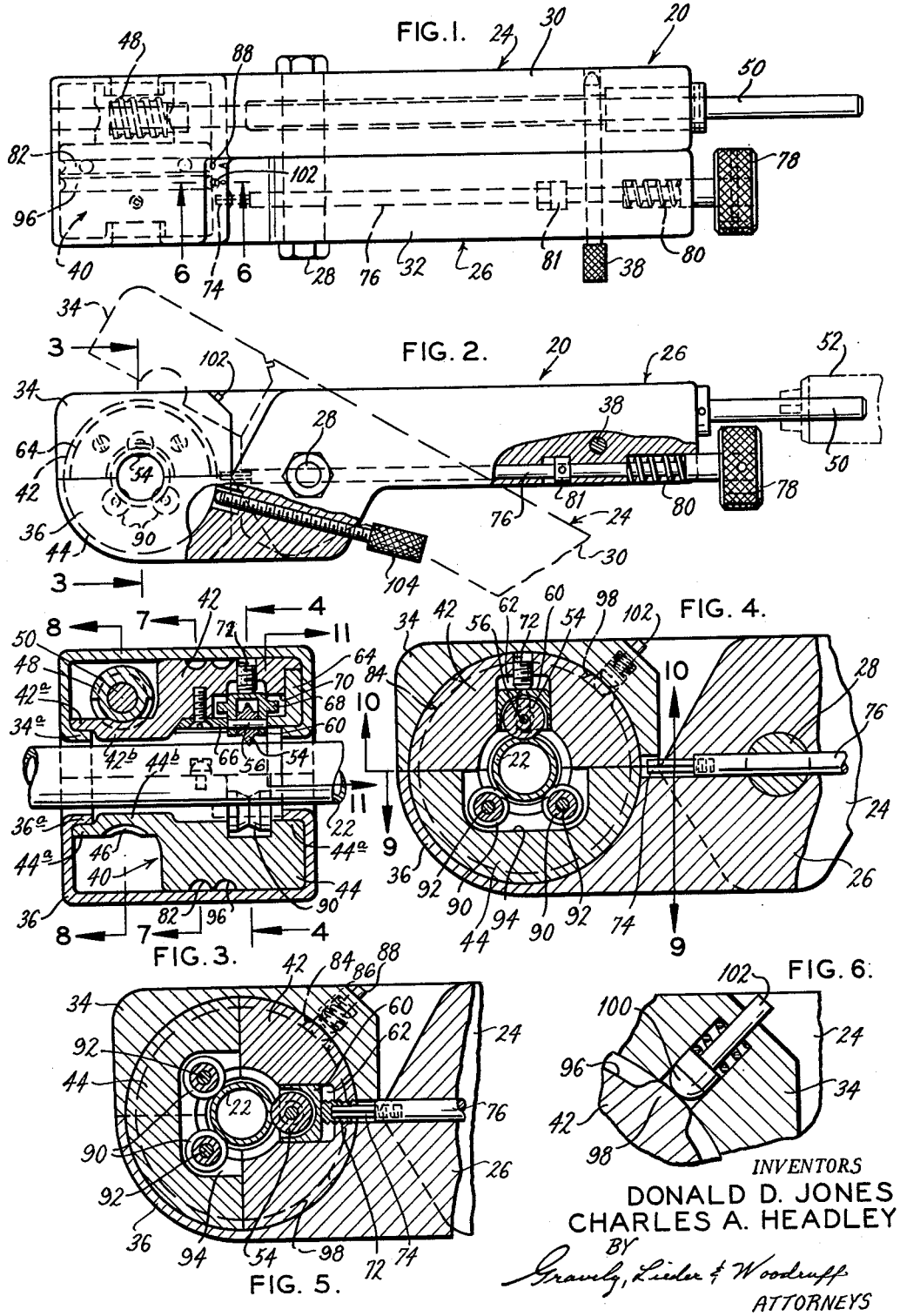
INVENTORS
DONALD D. JONES
CHARLES A. HEADLEY
BY
Gravely, Lieder & Woodruff
ATTORNEYS

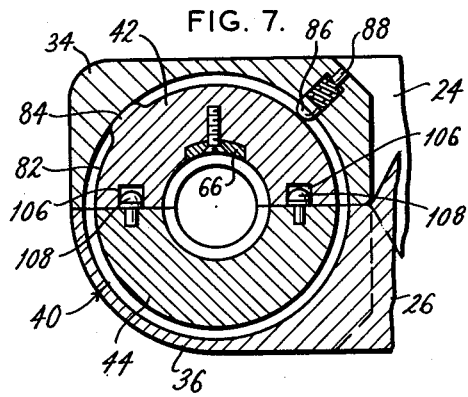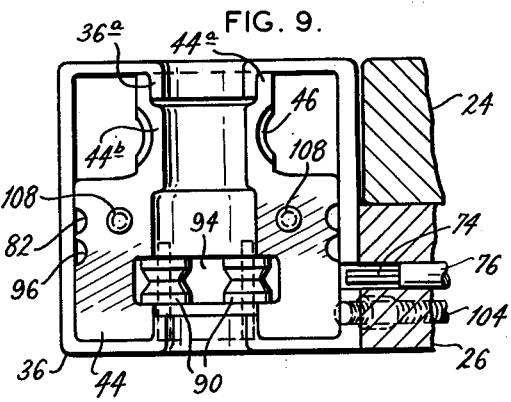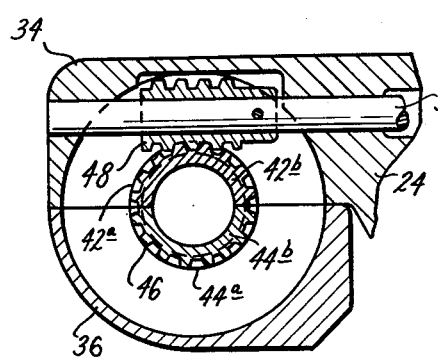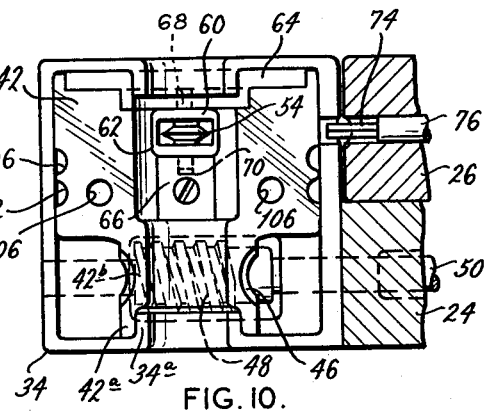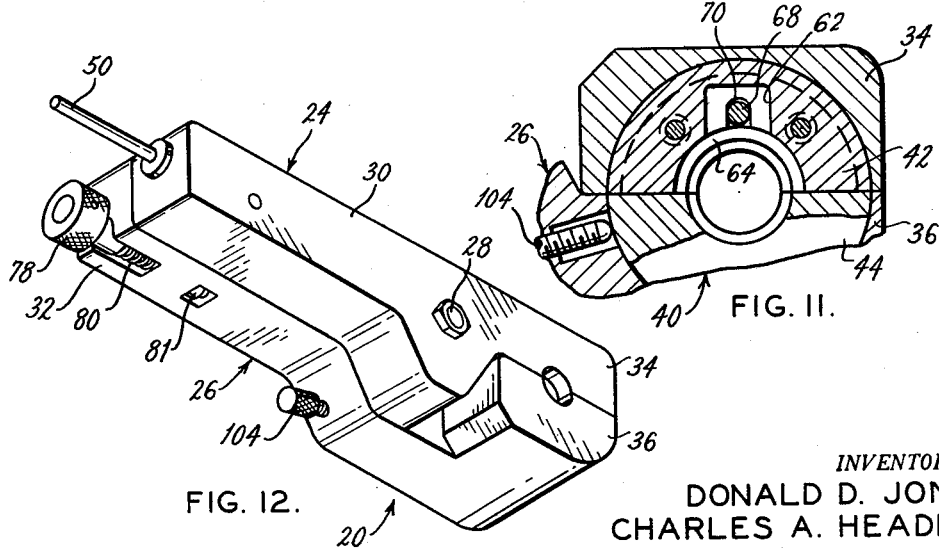

United States Patent Office 3,136,057
Patented June 9, 1964

3,136,057
TUBE CUTTING TOOL
Donald D. Jones, Roxana, and Charles A. Headley, Alton, Ill., assignors to McDonnell Aircraft Corporation, St. Louis County, Mo., a corporation of Maryland
Filed Oct. 31, 1962, Ser. No. 234,295
6 Claims. (Cl. 30—101)

The invention described herein was made in the performance of work under a NASA contract and is subject to the provisions of the National Aeronautics and Space Act of 1958, Public Law 85-568 (72 Stat. 426; 42 U.S.C. 2451), as amended.

The present invention relates generally to tools for severing tubes, pipes and other similar devices, and more particularly to a portable hand tool which can be operated in areas of limited space and access.

Many tools and other devices for severing tubes and the like have been constructed and used heretofore. For the most part, however, the known tools have required considerable space in which to operate and have therefore been unsuitable for use in areas of limited space and limited access. In this connection it should be pointed out that all known tube cut-off tools have required large areas for their movement and for the most part have not been suitable for use on tubes already wholly or partially installed in a system. For these and other reasons the known tools have been unsatisfactory and unsuitable for operation especially at work sites of limited area and access.

The present tool overcomes these and other disadvantages and shortcomings of known tools by providing a portable hand tool of relatively simple and inexpensive constructions which can be operated in extremely limited areas with a minimum of tool movement and by persons with little or no training.

The present tool comprises a pair of clamp members adapted to be clamped onto a tube or pipe to be severed, one of said clamp members includes backing means engageable with the tube or pipe on one side, and the other of said clamp members has a cutter member which engages the tube or pipe substantially opposite from said backing means, said cutter member and said back up means being mounted on an assembly rotatably positioned in the clamp members, means for rotating said rotatable assembly, and means for moving the cutter member and backing means toward or away from each other to vary the cutting pressure of the tool on a tube or pipe. The tool also includes means for locking the rotatable assembly in a preselected position in the clamp members whereby said rotatable member includes a separate portion associated with each clamp member, said separate portions opening up with the associated clamp members in said preselected position.

It is a principal object of the present invention to provide a portable tool for cutting tubes, pipes and other similar devices.

Another important object is to provide a tube cut-off tool capable of being operated in areas of limited space and access.

Another object is to provide a tube cut-off tool of relatively simple and inexpensive construction which can be operated by persons with little or no training or experience.

Another object is to provide a tool which can be used to sever tubes and pipes of different sizes.

Another object is to provide a tube cut-off tool which can be held in one position by the operator during operation thereof.

Another object is to provide a tube cut-off tool with cutting pressure control means.

Another object is to provide a portable tube cut-off tool that can be powered by an electric drill or other conventional source.

These and other objects and advantages of the present tube cut-off tool will become apparent after considering the following detailed specification of a preferred embodiment in conjunction with the accompanying drawings, wherein:

FIG. 1 is a top plan view of a tool constructed according to the present invention;

FIG. 2 is a side elevational view of the same tool with one portion thereof shown in an alternate position in phantom outline;

FIG. 3 is an enlarged cross-sectional elevational view taken on line 3—3 of FIG. 2;

FIG. 4 is an enlarged fragmentary cross-sectional elevational view taken on line 4—4 of FIG. 3;

FIG. 5 is another enlarged fragmentary cross-sectional elevational view similar to FIG. 4 but showing the tool in a different operating position;

FIG. 6 is a further enlarged fragmentary cross-sectional view taken on line 6—6 of FIG. 1;

FIGS. 7 and 8 are further enlarged fragmentary cross-sectional views taken on lines 7—7 and 8—8 respectively of FIG. 3;

FIGS. 9 and 10 are enlarged fragmentary cross-sectional views looking in an opposite direction respectively from the common line labeled 9—9 and 10—10 on FIG. 4;

FIG. 11 is a fragmentary cross-sectional view taken on line 11—11 in FIG. 3; and FIG. 12 is a perspective view of the subject tool.

Referring to the drawings more specifically by reference numbers, the number 20 refers generally to a cut-off tool designed specifically for severing tubes and pipes such as the tube 22 shown in FIGS. 3, 4 and 5. The tube 22 can be installed in a system or it can be a piece taken from stock and the tube can be severed at a work site or in any convenient location. It is important to the present invention that the subject tool be portable, compact and lightweight and that it can be operated without movement in order to be used at work sites of limited space and access as will be shown.

The tool 20 has two main portions 24 and 26 which are hingedly connected together by pivot means 28 which extend therethrough as shown in FIGS. 1, 2 and 12. The members 24 and 26 have handle portions 30 and 32 respectively, and clamp portions 34 and 36 respectively.

Under predetermined conditions which will be described, the handle portions 30 and 32 can be moved apart from their closed position shown in FIGS. 1 and 12 to their open position illustrated by the phantom outline in FIG. 2. In open position the clamp portions 34 and 36 can be moved onto a tube or pipe to be severed and reclosed as illustrated by FIGS. 3, 4 and 5. In the closed position power is supplied to the tool and the tool is adjusted in one or more steps to sever the tube. When the tool is clamped on a tube or pipe it is locked closed by a pin 38 (FIG. 1) which extends through aligned holes in the members 24 and 26.

The clamp portions 34 and 36 mate when the tool is closed to form a chamber around the tube 22 in the area where the tube is to be severed. A rotatable cutter assembly 40 is positioned in the clamp portions 34 and 36 and is formed by two semi-cylindrical portions 42 and 44 which also mate and rotate in the mating clamp portions 34 and 36. The ends of the portions 42 and 44 have portions 42a and 44a that cooperate with flanges 34a and 36a on the ends of the clamp portions 34 and 36 as shown in FIG. 3. This cooperation allows the assembly 40 to rotate and also helps to prevent the portions 42 and 44 from falling out when the tool is opened. The semi-cylindrical portions 42 and 44 also have mating ends 42b and 44b which together form an annular gear 46 on their outer surfaces that meshes with a worm gear 48. The worm gear 48 is mounted on a shaft 50 that extends lengthwise through the member 24 and has an external portion which cooperates with a chuck 52 on an electric hand drill or other similar power source. Suitable bearing means are also provided in the member 24 to rotatably support the shaft 50 and the worm gear 48. When the tool 20 is clamped on a tube and the shaft 50 is rotated, the cutter assembly 40 rotates inside the clamp portions 34 and 36.

The portion 42 of the cutter assembly 40 carries an adjustable cutter member 54. The member 54 is a hardened member with a cutting edge and is rotatably supported on a shaft 56, the ends of which are positioned in holes in similar legs of an adjustable saddle 60. The saddle 60 is radially movable in a cut-out portion 62 of the member 42 and is maintained in this position by members 64 and 66 which are attached to the members 42 by screws or the like. The saddle 60 also has endwardly projecting elements 68 which are slidable in slotted portions 70 of the cut-out 62 to maintain proper alignment of the cutter member 54 during radial adjustment thereof.

The saddle 60 is radially adjustable in the cut-out 62 by means of a headless set screw 72 positioned in a threaded passage in the member 42. The set screw 72 has a wrench socket in its outer end which receives an adjustment member 74 (FIGS. 1, 4 and 5) when the assembly 40 is moved to a particular position in the clamp members 34 and 36. The adjustment member 74 is positioned on the end of a shaft 76 that extends through the member 26. The opposite end of the shaft 76 has an adjustment knob 78 which is biased into an outwardly extending position by a spring 80. However, when the cutter assembly 40 is rotated to the aforesaid adjustment position in which the set screw 72 is aligned with the adjustment member 74 the knob 78 is depressed and rotated to seat the adjustment member 74 in the set screw socket, and thereafter further rotation of the member 74 advances the saddle 60 and the cutter member 54 toward the tube. Rotation of the member 74 in the opposite direction can also be made to allow the cutter member to move away from the tube 22. The shaft 76 also carries a fixed ring member 81 which limits its travel in both directions.

In order to know when the adjustment member 74 is aligned with the set screw 72, the outer surface of the assembly 40 is provided with an annular groove 82 that has a cam portion 84 (FIGS. 1, 3 and 5). The groove 82 and cam 84 cooperate with a spring biased plunger 86 (FIGS. 5 and 7) which has a head portion 88 that projects through a hole in the member 24 (FIG. 1). A letter "A" is inscribed on the member 24 (FIG. 1) adjacent to the head 88 to indicate that the head 88 is for aligning the adjustment means. When the head portion 88 is flush with the surface of the member 24 the plunger member 86 is in the bottom of the groove 82, and when the head portion 88 extends outwardly from the surface of member 24 the plunger member 86 is on the cam 84. In the latter position the adjustment member 74 lines up with the set screw 72 and adjustment of the cutter 54 is possible.

The portion 44 of the cutter assembly 40 is provided with two spaced grooved back-up rollers 90. The rollers 90 engage the tube on the opposite side thereof from the cutter member 54 to provide support for the cutter member 54. The rollers 90 have shaft portions 92 which are rotatable in suitable holes formed in the side walls of a cut-out portion 94 of the member 44.

At times it is required to open the tool in order to clamp it on a tube or for some other reason. At such times it is necessary to have the cutter assembly 40 located in a particular position in the clamp portions 34 and 36 such that the portion 42 is substantially entirely within the clamp portion 34 and the portion 44 is substantially entirely within the clamp portion 36. If this is not done, it will be more difficult if not impossible to clamp the tool on a tube. In order therefore, to properly locate the cutter assembly 40 in the clamp portion so that the tool can be opened a second annular groove 96 is provided in the outer surface of the assembly 40 (FIGS. 1 and 3). The groove 96, like the groove 82, has a cam portion 98, and the groove 96 and cam 98 cooperate with another spring biased plunger member 100 positioned along side the plunger member 86. The plunger 100 has a head portion 102 that extends through a hole in the housing 26 adjacent to a letter "O" inscribed (FIG. 1) on the surface thereof to denote that when the head is in extended condition the tool is in position to open. The open position is illustrated in FIGS. 4 and 6. When the tool is in position to be opened a threaded locking member 104 (FIGS. 2 and 12) is turned in against the member 44 to hold it in place and prevent it from falling out. No similar locking means is required to hold the member 42 because it is engaged with the worm gear 48 and thereby prevented from falling out.

FIG. 7 shows a cross section of the cutter assembly 40 in which it will be seen that the portion 42 has recesses 106 which receive alignment lugs 108 on the member 44 when the members are clamped together. This is done to maintain alignment of the members 42 and 44 during operation of the tool. This also improves operation of the mating gears 46 and 48 as shown in FIGS. 3 and 8.

FIGS. 9 and 10 are plan views showing respectively the mating surfaces of the clamp members 36 and 34 and cutter assembly portions 44 and 42. These views also show the relative positions of the various components which make up the cutter assembly 40.

FIG. 11 shows the relationship between the projecting elements 68 of the saddle 60 and the slots or grooves 70 in which they move. In particular it shows the elongated shape of the slots 70 that allows the saddle and cutter member 54 to move radially.

There has thus been shown and described a novel cutting tool which is particularly adapted for cutting tubes, pipes and similar devices. Furthermore, there has also been shown and described a tool which is relatively simple to operate and which can be operated in areas of extremely limited space and access because the tool does not have to be moved during operation. Briefly, the tool is operated first by backing off on the cutter assembly and then clamping the tool onto a tube or other object to be cut, locking the clamp portions in clamped condition, adjusting the cutter pressure as aforesaid using the knob 78 and the set screw 72, releasing the knob 78 when the pressure is right to free the cutter assembly for rotation, and finally connecting a power tool such as an electric drill to the tool to drive the cutter assembly 40. After the assembly has been driven for a time, it may be necessary to readjust the cutter member to increase the cutting pressure and then repeat the operating step until the tube is severed. Once the tube is severed the tool 20 can be released therefrom by opening the clamp portions as already stated. After a tube has been severed it is usually desirable to back off the cutter member using the adjustment means to prevent accidentally overloading the cutter member at the start of the next operation.

Many variations of the operation and construction of the tool are possible, and also many different uses and embodiments in addition to those shown and described are also possible within the scope of this invention.

Thus there has been shown and described a novel tool which fulfills all of the objects and advantages sought therefor. Many changes, modifications and variations of the present tool as well as many different uses therefor, however, will become apparent to those skilled in the art. All such changes, modifications and variations which do not depart from the spirit and scope of the invention are

What is claimed is:

1. Tube severing means comprising a pair of clamp members hingedly connected together and adapted to be clamped onto a tube to be severed, a cutter assembly positioned in said clamp members, said assembly including a rotatable unit formed by two mating semi-cylindrical members, means forming a passage to receive a tube through said mating members, other means forming a gear on outer portions of said mating members, drive means engageable with said gear for rotating said cutter assembly in the clamp portions, one of said mating semi-cylindrical members having a cutter member located therein in position to engage a tube to be severed, the other of said semi-cylindrical members having tube support means located to engage the tube substantially opposite from the cutter member, means to indicate certain preselected conditions of the cutter assembly in the clamp members including cam and cam follower means, and means for changing the space between the cutter member and the tube support means.

2. A tool for severing tubes and the like comprising a cylindrical housing formed of two separate semi-cylindrical housing portions hingedly connected together with opposed openings adapted to receive a tube to be severed therethrough, a tube cutter assembly rotatably positioned in said housing, said assembly including two separable portions together defining a gear portion on an outer surface thereof and having a passage for receiving the tube to be severed therethrough, support means on one of said separable portions adjacent to said passage for engaging the tube to be severed, cutter means on the other of said separable portions adjacent said passage for engaging the tube at a location substantially opposite from the support means, drive means including a drive gear engageable with the aforesaid gear portion for rotating the cutter assembly in the housing around the tube, said separable portions of the cutter assembly being movable to positions in which each portion is substantially entirely within a different one of said separate housing portions, cam means to indicate the aforesaid positions of said separable portions in the housing portions, and means for adjusting the cutting pressure of the cutter member on the tube.

3. A tool for severing tubes and the like comprising a cylindrical housing formed of two separate semi-cylindrical housing portions with opposed openings adapted to receive a tube to be severed therethrough, a tube cutter assembly rotatably positioned in said housing, said assembly including two separable portions together defining a gear portion on an outer surface thereof and having a passage for receiving the tube to be severed therethrough, support means on one of said separable portions adjacent to said passage for engaging the tube to be severed, cutter means on the other of said separable portions adjacent said passage for engaging the tube at a location substantially opposite from the support means, drive means including a drive gear engageable with the aforesaid gear portion for rotating the cutter assembly in the housing around the tube, means for adjusting the cutting pressure of the cutter member on the tube, including cooperating alignable threaded means on one of said housing portions and on said other one of said separable portions, and cooperating cam means on said cutter assembly and said housing to indicate when the cooperating threaded adjustment means are in alignment.

4. In a tube cutting tool, a pair of handles, each having a clamp end, said handles being pivotally connected with said clamp ends adjacent each other and movable by said handles together or apart, means to lock said handles with said clamp ends together over a tube to be cut, a rotatable cutter assembly secured in said clamp ends comprising a semi-cylindrical portion secured in each clamp end, one of said portions operatively supporting tube back-up elements and the other portion adjustably supporting tube cutting means, threaded means in said other portion engaged with said adjustable tube cutting means and extending toward the outer periphery of the cylindrical surface thereof, adjusting means carried by said tool in position to extend into said clamp end adjacent said last mentioned cylindrical surface, said adjusting means being movable inwardly of the tool to engage said threaded means and turn the latter to effect adjustment of said tube cutting means, and means to rotate said cutter assembly for tube cutting.

5. In a tube cutting tool, a pair of handles, each having a clamp end, said handles being pivotally connected with said clamp ends adjacent each other and movable by said handles together or apart, means to lock said handles with said clamp ends together over a tube to be cut, a rotatable cutter assembly secured in said clamp ends comprising a semi-cylindrical portion secured in each clamp end, one of said portions operatively supporting tube back-up elements and the other portion adjustably supporting tube cutting means, threaded means in said other portion engaged with said adjustable tube cutting means and extending toward the outer periphery of the cylindrical surface thereof, drive means in one of said handles extending into driving engagement with said cutter assembly to rotate the latter for tube cutting operation, indicator means in said tool to signal when said cutter assembly is turned to a particular position, and means carried by said tool to engage said threaded means when said indicator means signals said particular position and effect adjustment of said tube cutting means.

6. The tool set forth in claim 5, wherein said indicator means includes cooperating cam and cam follower means with said follower means in position to be visible.

References Cited in the file of this patent

UNITED STATES PATENTS

| | | |
|---|---|---|
| 760,128 | Jackson | May 17, 1904 |
| 1,115,277 | Bodkin | Oct. 27, 1914 |
| 1,849,381 | Pealer | Mar. 15, 1932 |
| 2,672,682 | Studebaker et al. | Mar. 23, 1954 |
| 2,821,781 | Zeiler | Feb. 4, 1958 |